I. G. CHANDLEE & R. S. MARSHALL.
SPINNING OR TWISTING FRAMES.

No. 182,300. Patented Sept. 19, 1876.

UNITED STATES PATENT OFFICE.

ISAAC G. CHANDLEE, OF PHILADELPHIA, PENNSYLVANIA, AND REUBEN S. MARSHALL, OF MANCHESTER, NEW HAMPSHIRE.

IMPROVEMENT IN SPINNING OR TWISTING FRAMES.

Specification forming part of Letters Patent No. 182,300, dated September 19, 1876; application filed May 17, 1876.

*To all whom it may concern:*

Be it known that we, ISAAC G. CHANDLEE, of Philadelphia, Pennsylvania, and REUBEN S. MARSHALL, of Manchester, New Hampshire, have invented certain new and useful Improvements in Spinning or Twisting Frames; and we do hereby declare the following to be a full, clear, and exact description of the same, reference being had to the accompanying drawings, making part thereof.

Our invention consists of the combination, in a spinning or twisting frame, of a frame, a shaft, a worm, and a curved rack or worm-segment, and mechanism for imparting to the said shaft an intermittent motion, whereby a progressive elevation is given to the rings in spinning or twisting, substantially as hereinafter described; also, of the combination of a curved rack or segment, a worm, a shaft, and a handle to turn said shaft, so as to gently lower the rings after the bobbins are filled, substantially as hereinafter described.

To enable others skilled in the art to make and use our invention, we will describe its construction and operation.

Figure 1:
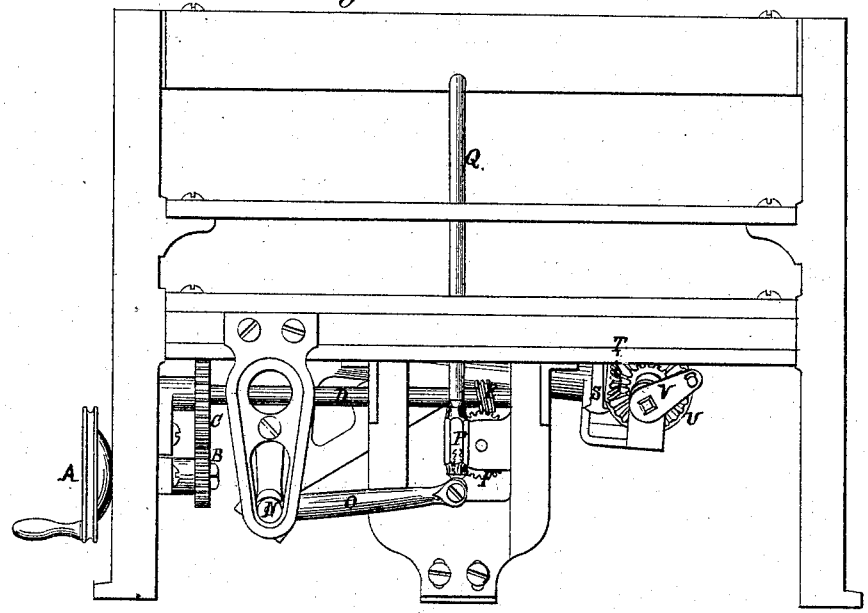
Figure 2:
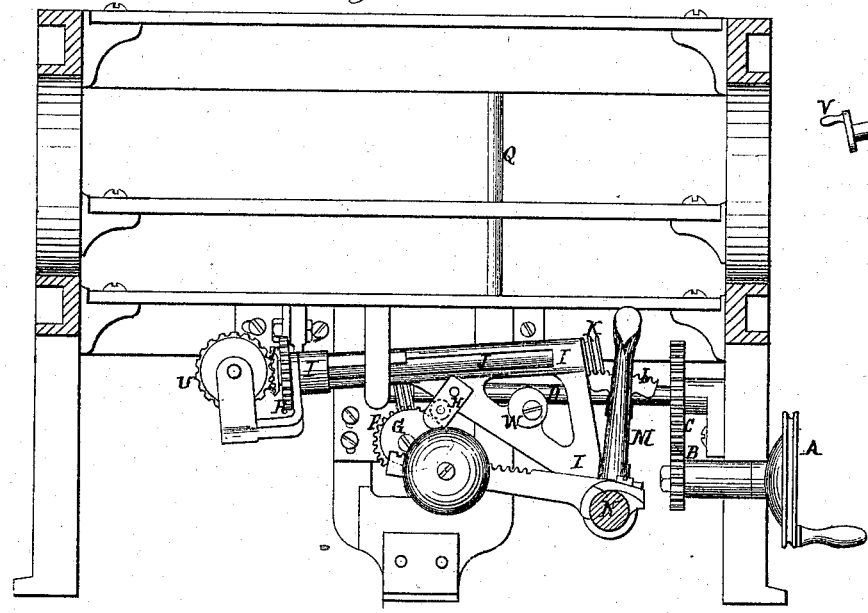
Figure 3:
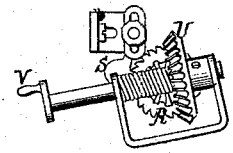

In the drawings, Figure 1 is a front elevation of a spinning-frame with our device attached. Fig. 2 is a rear elevation of the same, partially broken away. Fig. 3 is a detached view, showing the handle, ratchet, and pawl.

A is a grooved pulley and shaft, driven by a band from a corresponding grooved pulley attached to the front roller of the frame. B is a pinion on the shaft of pulley A, gearing into pinion C on the worm-shaft D. E is a worm, firmly attached to shaft D. F is a worm-wheel, to which is attached firmly the heart-shaped cam G. I I I is a frame, resting loosely at its lower corner upon the shaft N as a fulcrum, and which, by the action of cam G on the roller H, (which is a revolving roller attached to frame I, and rests on cam G,) is raised or depressed, as the case may be. J is a shaft attached to and resting in frame I. K is a worm at one of the extremities of the shaft J, which operates in and holds in place the geared or worm segment L, which, in turn, is attached to the rocker-post M on the rocker-shaft N. O is an arm, which is rigidly jointed to rocker-shaft N at right angles. P is an elongated adjustable nut, attached to arm O by means of a screw and eyebolt. Q is the lifter-rod, the foot or which rests in a cavity in the upper end of the nut P. To the lifter-rod Q is attached the ring-rail, ring, and traveler, which are familiar to all acquainted with ring-spinning. R is a ratchet attached to that end of shaft S which is opposite to the end containing worm K. S is a pawl, which is pivoted to the spinning-frame, and which, catching in and detaining the teeth of ratchet R as the frame I falls in vibrating, thus revolves shaft J, as will be hereafter described. T is a beveled pinion on shaft J. U is another beveled pinion on the shaft of handle V, and which gears into the beveled pinion T. W is an eccentric or irregular cam secured to frame I by a screw, and is used to regulate the traverse of the segment L. When the thick part of the cam is interposed between its screw and the segment L, the point at which the segment starts from the cam is higher and its traverse shorter than when the thinner part of the eccentric is so interposed.

The operation is as follows: Motion being applied to pulley A, the worm-shaft D, through pinions B and C, is revolved, and with it the worm E, which, in turn, gearing into worm-wheel F, revolves it, and with it the cam G, which is firmly attached to worm-wheel F. Roller H, which rests on cam G, is by the action of cam G gradually raised, (at the beginning of the operation,) and the frame I, to which roller H is attached, is also raised. This action of frame I, by carrying rocker-post M with it, gives rocker-shaft N, to which rocker-post M is firmly attached, a partial revolution. Rocker-shaft N, in turn, raises arm O, which, in its turn, raises adjustable nut P and lifter-rod Q. The frame I, having been raised as high as possible by cam G, by the action of cam G on roller H is now lowered, carrying with it the rocker-post M, which reverses the former revolution given to rocker-shaft N, and thus lowers arm O and the adjustable nut P and lifter-rod Q. The frame I, having reached its lowest point, is again gradually raised by the action of cam G, as before, and is then lowered in turn in the same way. The lifter-rod Q is thus alternately elevated and depressed, and this vibrating movement is kept up throughout the whole operation. This movement may be designated as movement 1.

While this movement 1 is going on, a movement 2 is being carried out, as follows, viz: As the frame I, in its vibrating movement, begins to fall, the ratchet U on the shaft J, which rests in frame I, also falls, and the pawl S, catching in the teeth of the ratchet as the ratchet falls, detains the teeth and gives the ratchet a partial turn. Thus the shaft J and worm K are also given a partial turn. The worm K, operating in the worm-segment L, gradually forces the said segment away from point (cam) W upon the frame I. By this movement rocker-post M, to which the worm-segment L is attached, is also forced back, giving a partial turn to rocker-shaft N. This partial turn, by means of arm O and adjustable nut P, raises lifter-rod Q. This movement is repeated at every fall of frame I, and the rocker-post M is forced farther and farther away from frame I, and the rocker-shaft N is turned more and more, and thus the lifter-rod Q, through arm O and adjustable nut P, is gradually more and more elevated.

This movement 2 does not interfere in any way with movement 1. The only effect of movement 2 upon movement 1 is to raise arm O and nut P and lifter-rod Q, and thus cause movement 1 to be produced at a greater elevation.

Rocker-post M, in falling with frame I, (movement 1,) carries rocker-shaft N no farther back than to that position which it occupied when the last upward movement of movement 1 began. While the frame I is falling, shaft J, through pawl S and ratchet R, forces the worm-segment L and rocker-post M away from the frame I, and thus gives rocker-shaft N another partial turn forward, thus raising arm O, and with it the adjustable nut P and lifter-rod Q.

Movement 1 is accomplished, it will be seen, by an upward and downward motion of frame I, while movement 2 is accomplished by continually changing the position of rocker-post M. It will thus be seen that movement 1 is produced at gradually more and more elevated positions as movement 2 progresses, which is the object of this invention, as by movement 1 the ring and traveler are thus enabled to lay the yarn as it comes from the front roller layer upon layer, conically and spirally, up and down for a certain distance upon the bobbin. Movement 2 then comes into play, and gradually elevates the ring-rail and ring, so that movement 1 starts at progressively-elevated points upon the bobbin, thus producing a bobbin suitable to weave in the shuttle of a loom.

When the bobbin becomes full of yarn from the united actions of movements 1 and 2, it is necessary to let the ring-rail and ring down to their original starting-point, so that the frame may be doffed. This is accomplished as follows, viz: The pawl S being held from out of the teeth of ratchet R, the handle V is revolved, and thus, through the beveled pinions T and U, the shaft J is revolved in a direction opposite to that given by ratchet R, movement 2. In other words, the action of movement 2 is reversed, and the lifter-rod Q is lowered to its original position, and the frame is ready to doff. The cam W, as will be seen, regulates the height at which segment L commences in its traverse to leave the frame I.

Having thus described our invention, what we claim as new, and desire to secure by Letters Patent, is—

1. The combination, in a spinning or twisting frame, of the frame I, shaft J, worm K, curved rack or worm-segment L, and mechanism for imparting to the said shaft an intermittent motion, whereby a progressive elevation is given to the rings in spinning or twisting, substantially as described.

2. The combination of curved rack or worm-segment L, worm K, shaft J, and a handle to turn the shaft J, so as to gently lower the rings after the bobbins are filled, substantially as and for the purpose described.

ISAAC G. CHANDLEE.
REUBEN S. MARSHALL.

Witnesses:
THOS. D. LUCE,
NATHAN P. HUNT.